United States Patent [19]

Kamiura et al.

[11] Patent Number: 5,744,837

[45] Date of Patent: Apr. 28, 1998

[54] SEMICONDUCTOR DEVICE COMPRISING A MATRIX ARRAY, AND THIN-FILM TRANSISTOR LIQUID-CRYSTAL DISPLAY DEVICE

[75] Inventors: Norihiko Kamiura, Yokohama; Hisaaki Hayashi, Himeji, both of Japan

[73] Assignee: Kabushiki Kaisha Toshiba, Kawasaki, Japan

[21] Appl. No.: 558,895

[22] Filed: Nov. 16, 1995

[30] Foreign Application Priority Data

Nov. 17, 1994 [JP] Japan .................. 6-283466

[51] Int. Cl.⁶ .................. H01L 23/62
[52] U.S. Cl. .................. 257/355; 257/360; 257/59; 257/72; 257/368
[58] Field of Search .................. 257/355, 360, 257/59, 72, 368

[56] References Cited

U.S. PATENT DOCUMENTS 5,371,351 12/1994 Van Berkel .................. 257/443

FOREIGN PATENT DOCUMENTS 63-220289 9/1988 Japan .

*Primary Examiner*—Mark V. Prenty
*Attorney, Agent, or Firm*—Oblon, Spivak, McClelland, Maier & Neustadt, P.C.

[57] ABSTRACT

A semiconductor device comprising a matrix array, an auxiliary line, and static electricity discharging circuit. The matrix array has a plurality of address lines, a plurality of data lines, and switching elements provided at intersections of the address lines and the data lines. The auxiliary line surrounds the matrix array. The static electricity discharging circuit is connected between the auxiliary line and the address and/or data lines. The static electricity discharging circuit comprises a first discharge circuit having a plurality of switching elements connected in series and a second discharge circuit having a plurality of switching elements connected in series.

50 Claims, 5 Drawing Sheets

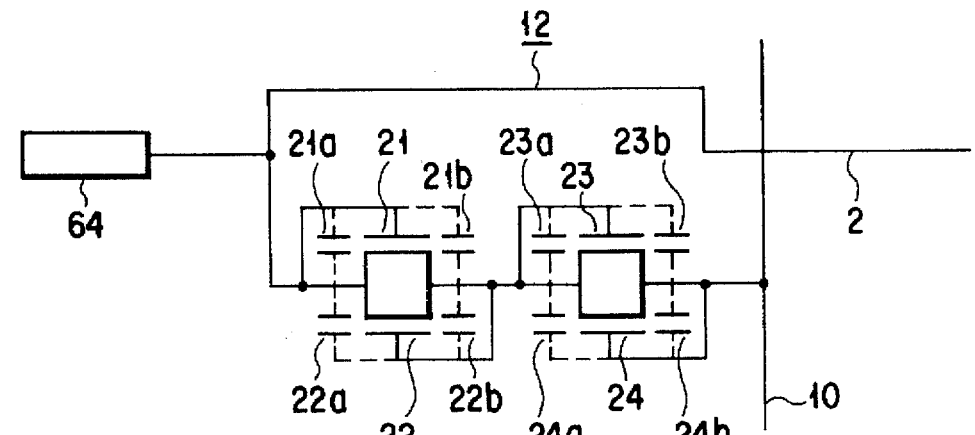
F I G. 5
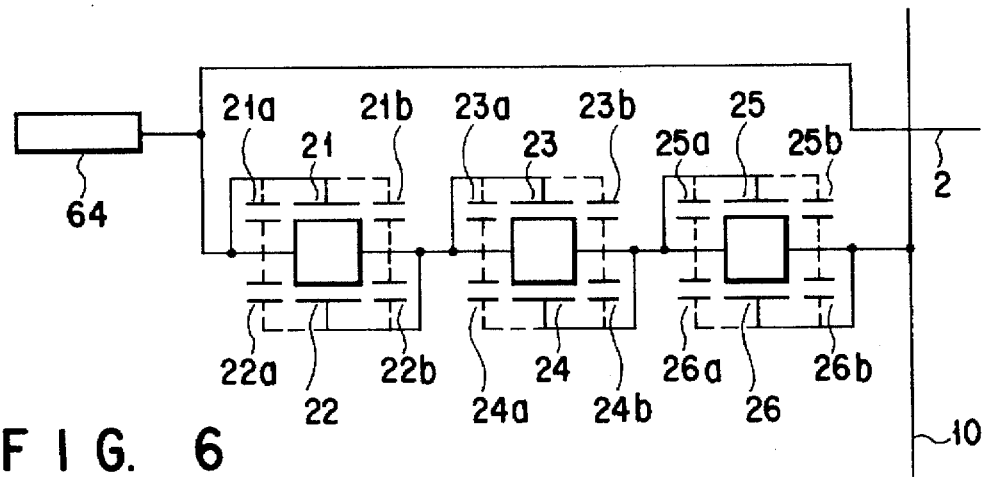
F I G. 6
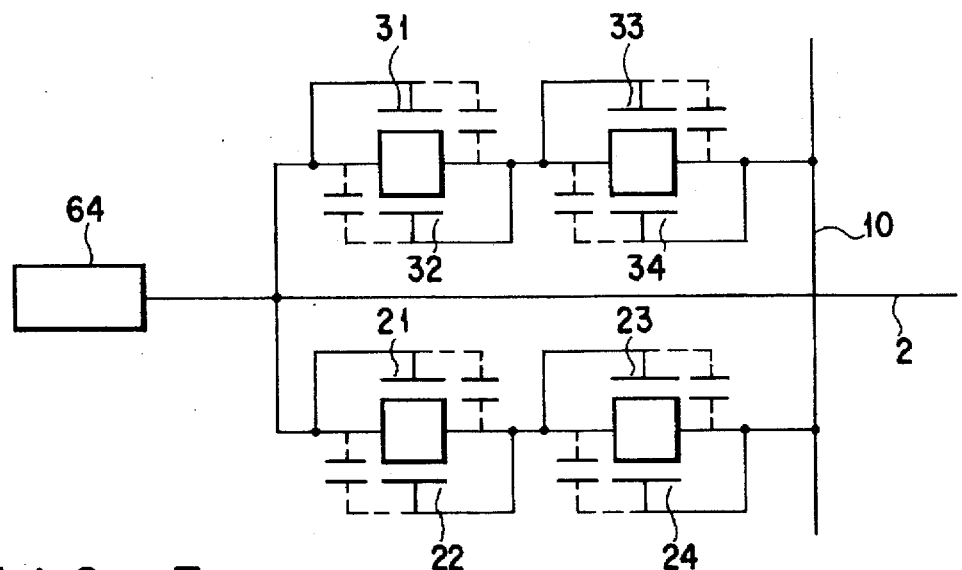
F I G. 7

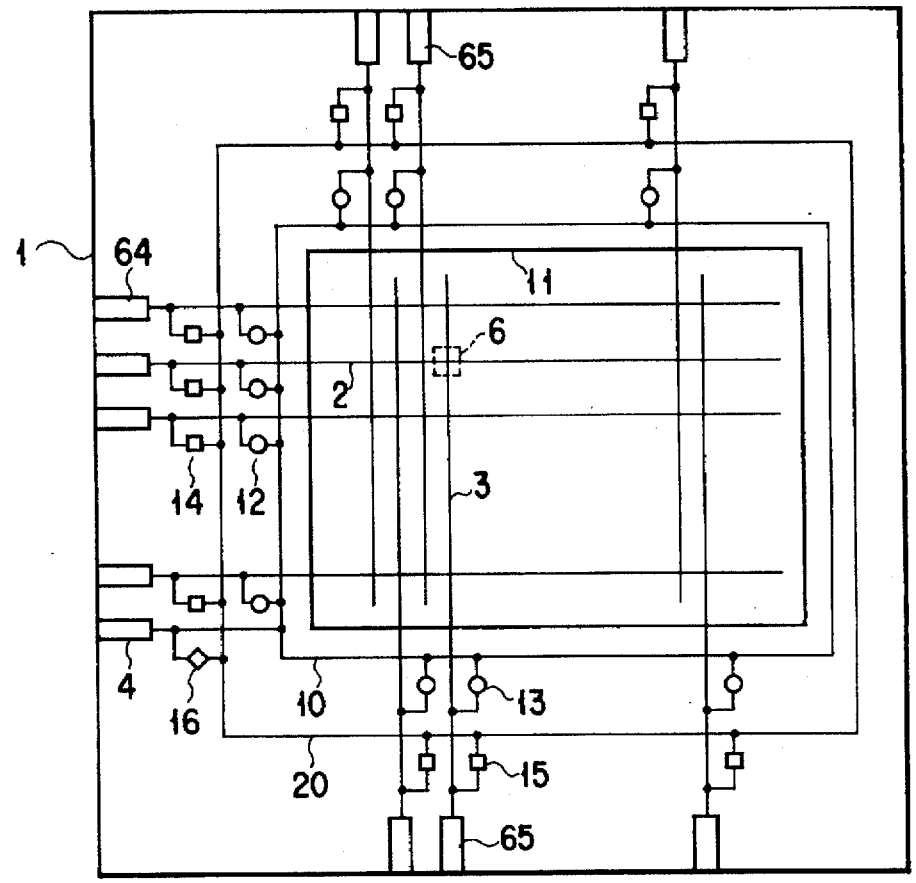
FIG. 10
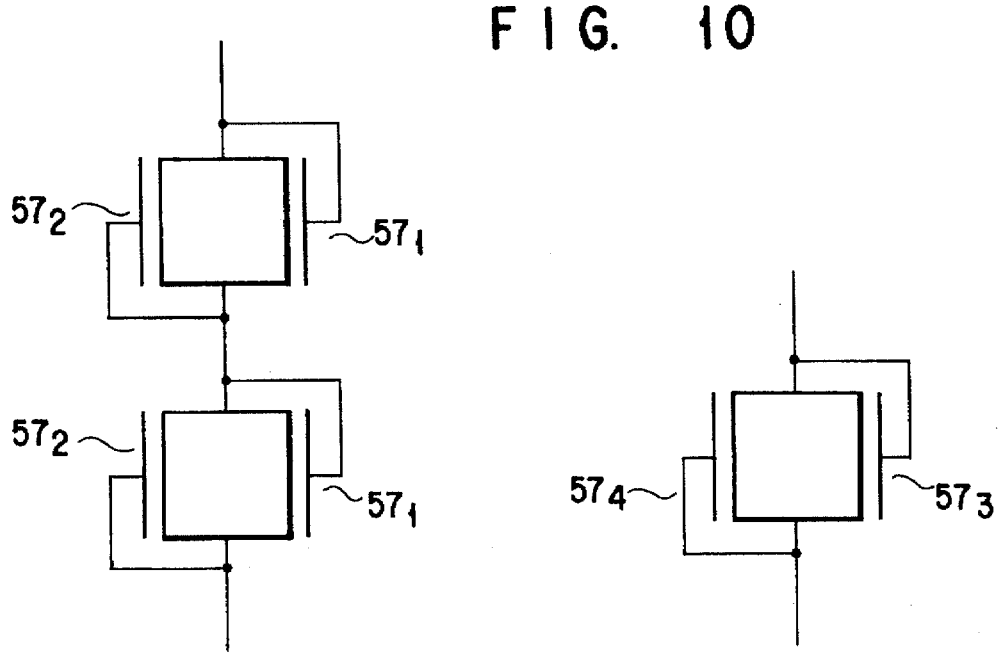
FIG. 11
FIG. 12

SEMICONDUCTOR DEVICE COMPRISING A MATRIX ARRAY, AND THIN-FILM TRANSISTOR LIQUID-CRYSTAL DISPLAY DEVICE

BACKGROUND OF THE INVENTION

1. Field of the Invention

The present invention relates to a semiconductor device comprising a matrix array, such as a liquid-crystal display or a semiconductor memory, and also to a thin-film transistor liquid-crystal display (TFT-LCD) device.

2. Description of the Related Art

An active-type liquid-crystal display comprising thin-film transistors (TFTs) used as switching elements is advantageous in some respects. First, it is thin and light. Second, it can be driven with a low voltage. Third, it can easily be modified into a color liquid-crystal display. For these advantages, it has recently come to be incorporated in personal computers and word processors.

A liquid-crystal display of this type comprises an insulating TFT-array substrate, a counter substrate opposing the TFT-array substrate, and a layer of liquid crystal interposed between these substrates. A transparent electrode (counter electrode) is provided on that surface of the counter substrate which faces the TFT array substrate. A pixel section (display section) is provided on that surface of the TFT-array substrate which faces the counter substrate.

The pixel section comprises pixel electrodes and thin-film transistors (TFTs), which are arranged on the TFT-array substrate, in rows and columns, forming a matrix. Each pixel electrode is transparent. Each TFT has its source connected to one pixel electrode, its gate to an address line, and its drain to a data line.

Like a MOS transistor, a TFT is likely to be affected by static electricity. To protect the TFTs against static electricity, the TFT-array substrate is designed specifically. For example, as shown in FIG. 1, the TFT-array substrate has a short-circuiting line 66 connected to address lines 62 and data lines 63 which are provided on the TFT-array substrate. Connected to the lines 62 and 63 which in turn are connected to the TFTs, the short-circuiting line 66 serves to dissipate static electricity from the TFTs.

After the static electricity has been dissipated to the short-circuiting line 66, the short-circuiting line 66 is removed by scribing, for example, from the TFT-array during the manufacture of the TFT liquid-crystal display. As a result, the address lines 62 and the data lines 63 are disconnected from one another. ICs and like components are then mounted on the TFT-array substrate. Signals can be supplied through the address lines 62 and the data lines 63 to drive the TFTs.

The number of address lines 62 provided on the TFT-array substrate amounts to hundreds or thousands. So does the number of the data lines 63 formed on the TFT-array substrate. Nonetheless, only a few of these lines are illustrated in FIG. 1. As seen from FIG. 1, terminals 64 and 65 are formed on the TFT-array substrate. Although not shown in FIG. 1, the pixel electrodes are provided at the intersections of the address lines 62 and the data lines 63.

Since the short-circuiting line 66 is removed from the TFT-array during the manufacture of the display, the TFT liquid-crystal display cannot remain protected from static electricity until the last manufacturing step is carried out. To protect the TFTs on the TFT-array substrate until the last manufacturing step is performed and thereafter it is proposed that, as shown in FIG. 2, impedance elements be formed in the same process along with the pixel electrodes and be connected between one address line 62 and an auxiliary line 61 contacting neither the data line 63 nor the pixel electrode. As seen from FIG. 2, two TFTs 67 and 68 connected in parallel and used as impedance elements which form a discharging circuit. The TFT 67 has its source and gate short-circuited, and the TFT 68 has its drain and gate short-circuited.

The discharge circuit can dissipate static electricity to the auxiliary line 61 even if the data line 63 or the auxiliary line 61 is set at a high potential. This is because either the TFT 67 or the TFT 68 is turned on when the line 63 or 61 is set at a high potential. The discharge circuit serves to protect the protect TFTs on the TFT-array substrate because it is not removed from the TFT-array substrate as the short-circuiting line 66, not only during the manufacture of the display but also after the last manufacturing step thereof is completed.

The discharge circuit element of the type described above, however, cannot prevent all TFTs used as switching elements from malfunctioning. Consequently, the TFT liquid-crystal display incorporating the TFTs cannot be manufactured at a sufficiently high yield.

SUMMARY OF THE INVENTION

The first object of the present invention is to provide a semiconductor device having a matrix array, in which switching elements of the matrix array, such as TFTs, are protected from static electricity and which can therefore be manufactured at a sufficiently high yield.

The second object of the invention is to provide a thin-film transistor liquid-crystal display having a matrix array, in which TFTs of the matrix array, are protected from static electricity and which can therefore be manufactured at a sufficiently high yield.

To achieve the first object, there is provided a semiconductor device comprising: a matrix array having a plurality of address lines, a plurality of data lines and switching elements provided at intersections of the address lines and the data lines; an auxiliary line surrounding the matrix array; and static electricity discharging means connected between the auxiliary line and the address and/or data lines and having a plurality of switching elements connected in series.

To achieve the first object, there is provided a semiconductor device comprising: a matrix array having a plurality of address lines, a plurality of data lines and switching elements provided at intersections of the address lines and the data lines; an auxiliary line surrounding the matrix array; and static electricity discharging means connected between the auxiliary line and the address and/or data lines, the static electricity discharging means comprises a first discharge circuit having a plurality of switching elements connected in series and a second discharge circuit having a plurality of switching elements connected in series.

To achieve the second object, there is provided a thin-film transistor liquid-crystal display comprising: a TFT-array substrate having a plurality of address lines, a plurality of data lines and pixels provided at intersections of the address lines and the data lines, each having a pixel electrode and a TFT; a counter substrate opposing the TFT-array substrate; a layer of liquid crystal interposed between the counter substrate and the TFT-array substrate; an auxiliary line formed on the TFT-array substrate; and static electricity discharging means connected between the auxiliary line and the address and/or data lines and having a plurality of switching elements connected in series.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a diagram showing the discharge circuit incorporated in the display shown in FIG. 3;

FIG. 6 is a circuit diagram illustrating the discharge circuit formed on the TFT-array substrate of a thin-film transistor liquid-crystal display according to a second embodiment of the invention;

FIG. 7 is a circuit diagram showing the discharge circuit formed on the TFT-array substrate of a thin-film transistor liquid-crystal display according to a third embodiment of the invention;

FIG. 10 is a schematic plan view of a thin-film transistor liquid-crystal display which is a fifth embodiment of the present invention;

FIG. 11 is a diagram showing the discharge circuit incorporated in the display illustrated in FIG. 10; and FIG. 12 is a diagram showing another type of an alternative discharge circuit for use in the display shown in FIG. 10.

DETAILED DESCRIPTION OF THE PREFERRED EMBODIMENTS

The principles of the present invention will be first explained. The inventors thereof conducted profound research on a discharge circuit of the type shown in FIG. 2. The results of the research showed that the discharge circuit has the following problems:

First Problem

The gate insulating film of each TFT constituting the discharge circuit has a withstand voltage of about 100V. The static electricity applied to the TFT often has a potential equal to or higher than the withstand voltage. When applied to the TFT, such a high potential destroys the gate insulating film of the TFT. The auxiliary line is inevitably short-circuited to the address line of the data line, destroying the switching elements (TFTs) provided on the TFT-array substrate.

Second Problem

The number provided on the TFT-array substrate and constituting the discharge circuits amounts to hundreds or thousands. In the process of forming so many TFTs on the substrate, some of these TFTs come to have pin holes in their gate-insulating films, due to dust particles or the like. Any discharging TFT having pin holes is short-circuited and cannot operate normally.

Third Problem

The discharging TFTs are formed in the same process along with the switching TFTs provided on the substrate and have a threshold voltage $T_{th}$ nearly equal to the threshold voltage (usually about 5V) of the switching TFTs. Each discharging TFT is likely to be turned on while an ordinary drive voltage (5 to 25V) is applied to the switching TFTs. This would result in an increased power consumption.

Figure 1:
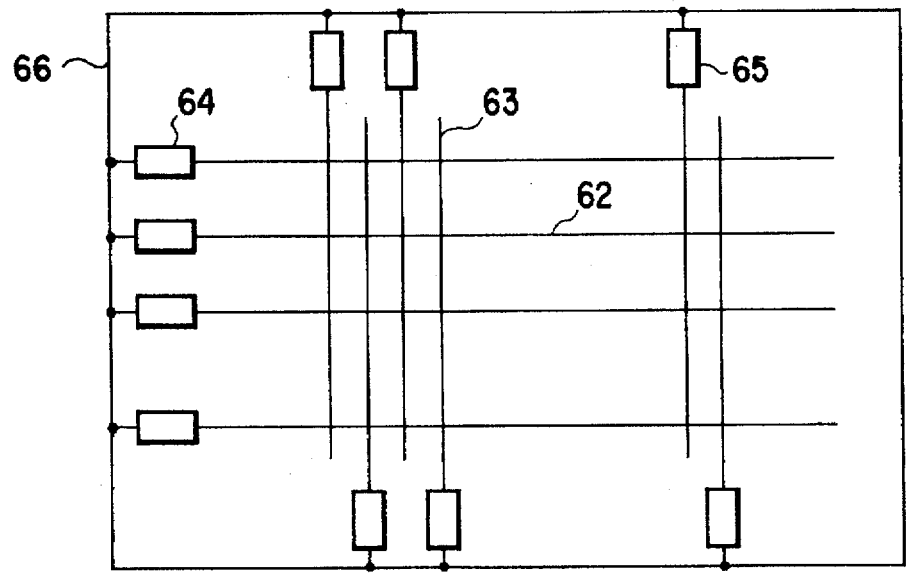
FIG. 1 is a diagram explaining a method of protecting the TFTs from static electricity, employed in a conventional liquid-crystal display.
Figure 2:
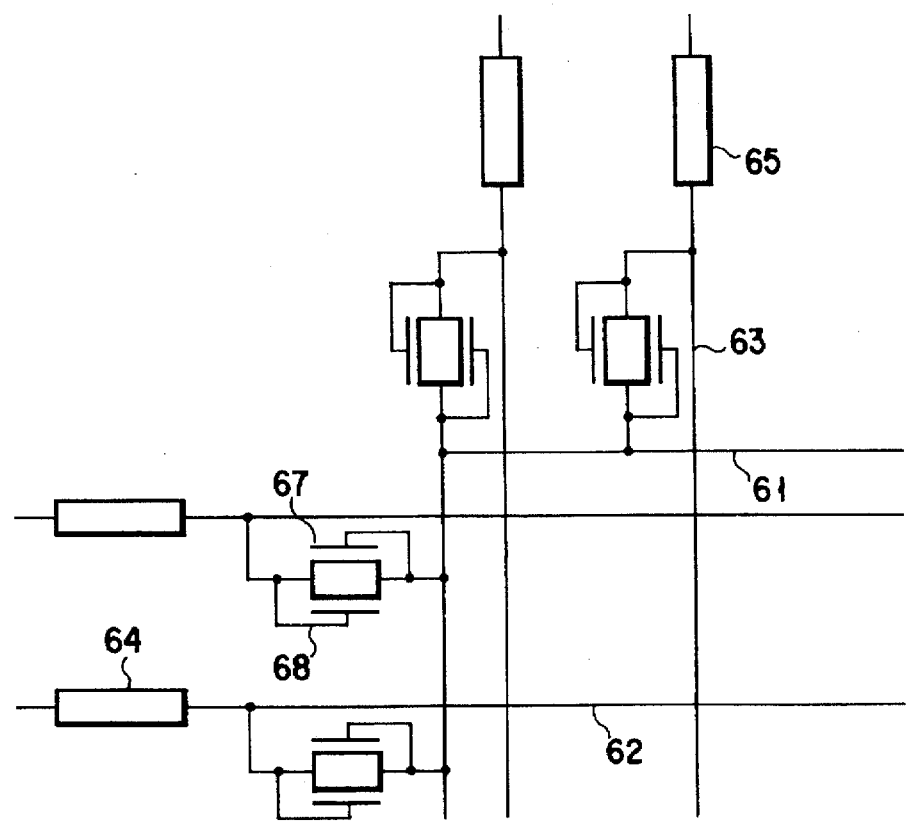
FIG. 2 is a diagram explaining another method of protecting the TFTs from static electricity, employed in a conventional liquid-crystal display.

The present invention uses a discharge means which is designed to dissipate static electricity to an auxiliary line from the TFTs provided on a TFT-array matrix and which is free of the above-mentioned three problems inherent in the discharge circuit shown in FIG. 2. The discharge means comprises TFT pairs connected in series. Each pair consists of two discharging TFTs which are connected in parallel. The discharging TFTs of each pair have two common source-drain electrodes, one of which is short-circuited to the gate of the first TFT and the other of which is short-circuited to the gate of the second TFT. When a voltage is applied to the discharge means, the discharging TFTs of each pair receives a voltage whose value is obtained by dividing the applied voltage by the number of the TFT pairs constituting the discharge means.

An electrostatic voltage, if any, applied to the discharge means, is divided by the number of the discharging TFT pairs provided into fractional voltages. A fractional voltage is applied to the discharging TFTs of each pair. It is too low to destroy the gate-insulating film of any discharging TFT. Thus, the first problem is solved. This makes it possible to provide a semiconductor device having a matrix array, in which switching elements of the matrix array, such as TFTs, are protected from static electricity and which can therefore be manufactured at a sufficiently high yield.

Some of the discharging TFTs may come to have pin holes in their gate-insulating films while being formed, due to dust particles or undesirable film-forming conditions. However, the ratio of defective TFT pairs to the flawless TFT pairs is low. The pairs of flawless TFTs, which have gate-insulating films with no pin holes, can divide an electrostatic voltage applied to the discharge means, into fractional voltages.

In practice, only one out of 10,000 discharging TFTs provided may be short-circuited. The probability that both discharging TFTs of any pair are short-circuited is 1/100,000,000 or less (=1/10,000×1/10,000). Hence, the discharge means is free of the second problem with the discharge circuit shown in FIG. 2. Even if a very high electrostatic voltage is applied to the discharge means, rendering a comparatively large number of TFT pairs defective, the flawless TFT pairs can divide the electrostatic voltage, into fractional voltages, each of which is too low to destroy the gate-insulating film of each discharging TFT.

Furthermore, the threshold voltage of any discharging TFT can be increased in proportion to the number of the discharging TFT pairs which are connected in series, thus constituting the discharge means. If given an increased threshold voltage, each discharging TFT would not be turned on while an ordinary drive voltage is applied to the switching TFTs. The power consumption is thereby decreased, solving the third problem of the discharge circuit illustrated in FIG. 2.

The discharge means according to this invention has nonlinear current-voltage characteristic no matter whether the potentials on the address line and the auxiliary line rise, or those on the data line and auxiliary line rise. In either case, as the voltage applied on the discharge means rises, the resistance of the discharging TFTs falls greatly, and a large current flows through the discharging TFTs. Thus, when a high voltage, such as that of static electricity, is applied to the discharge means, each discharging TFT has its resistance much decreased and can therefore efficiently dissipate the static electricity to the auxiliary line. Moreover, even if both charging TFTs of each pair are short-circuited, the discharge means maintains a current-voltage characteristic curve which is symmetric with respect to 0V. This means that the discharge means can operate well not only to dissipate static electricity to the auxiliary line but also to drive the switching TFTs in a normal way.

The discharging TFT pairs may be replaced by pairs of diodes, each consisting of two diodes which are connected in series in inverse polarity. The diode pairs accomplish the same advantages as the discharging TFT described above.

Preferred embodiments designed based on the above-described principles of the present invention will be described, with reference to the accompanying drawings.

First Embodiment

Figure 3:
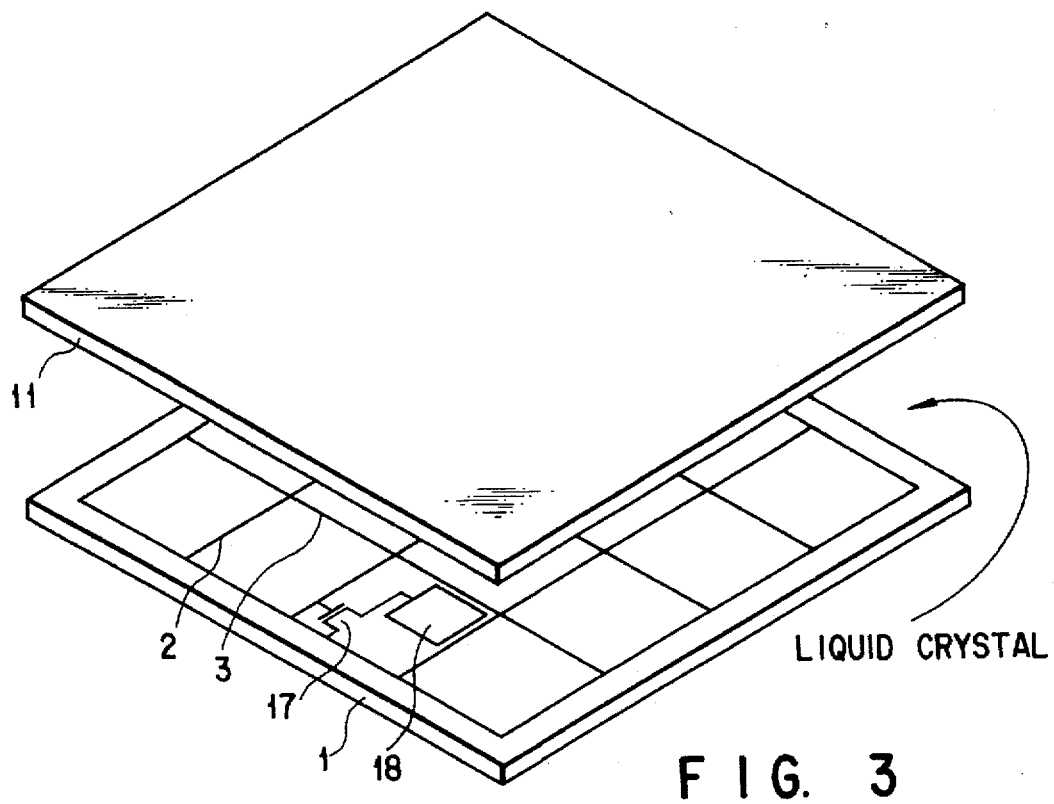
FIG. 3 is a perspective view of a liquid-crystal display according to a first embodiment of the present invention.
Figure 4:
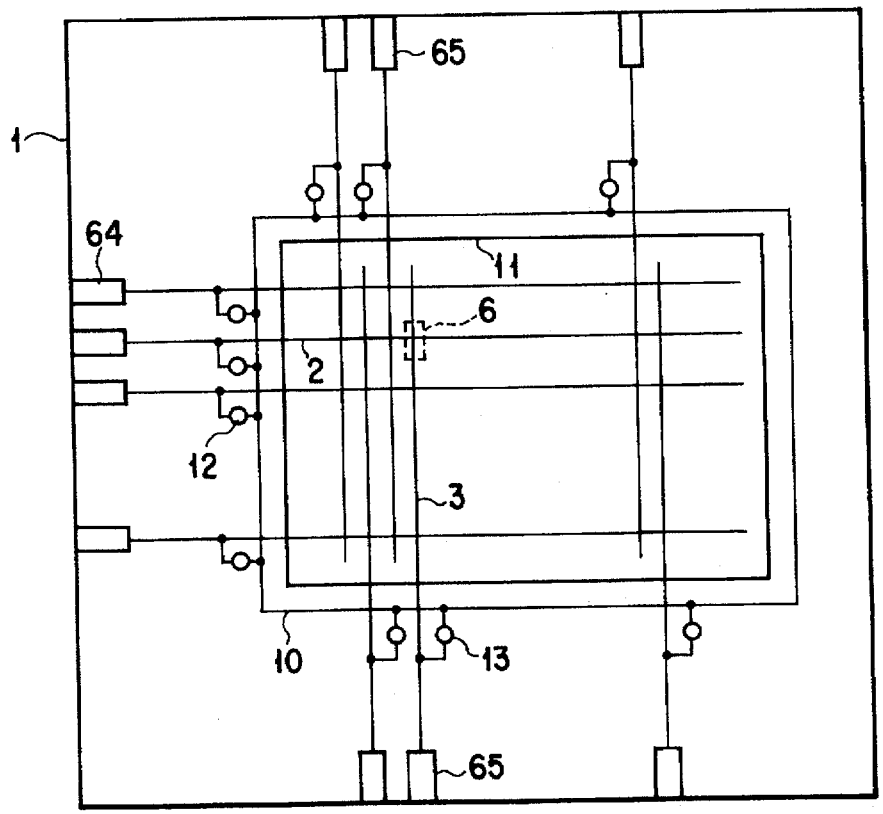
FIG. 4 is a schematic plan view of the liquid-crystal display shown in FIG. 3.

FIG. 3 is a perspective view of a liquid-crystal display according to a first embodiment of the invention, and FIG. 4 is a schematic plan view of the liquid-crystal display.

As shown in FIGS. 3 and 4, the liquid-crystal display comprises an TFT-array substrate 1 and a counter substrate 11. A layer of liquid crystal is interposed between the substrates 1 and 11.

A plurality of address lines 2 and a plurality of data lines 3 are formed on the TFT-array substrate 1. The address lines 2 extend at right angles to the data lines 3. Switching TFTs 17 functioning as switching elements are arranged at the intersections of these lines 2 and 3. So are pixel electrodes 18. Each TFT 17 has one of its source-drain electrodes connected to one pixel electrode 18. Each TFT 17 and the pixel electrode 18 connected to the TFT 17 constitute a pixel 6. Located located at the intersections of the address lines 2 and the data lines 3 which extend at right angles to the address lines 2, the switching TFTs 17 are arranged in rows and columns, thus forming a display matrix. The other source-drain electrode of each TFT 17 is connected to one data line 2, and the gate of the TFT 17 is connected to one address line.

The term "source-drain electrode" is used here. This is because the main electrode of each TFT functions as drain while the TFT is operating in one mode, and may function as source while the TFT is operating in another mode.

As shown in FIG. 4, terminals 64 and terminals 65 are provided on the edge portions of the TFT-array substrate 1. The terminals 64 are connected to the address lines 2, for receiving electric signals supplied form an external device. The terminals 65 are connected to the data lines 3, for receiving electric signals supplied from an external device.

An auxiliary line 10 is formed on the TFT-array substrate 1, forming a rectangular loop surrounding the display matrix. Discharge circuits 12 and discharge circuits 13 are provided on the TFT-array substrate 1, too. Each of the discharge circuits 12 is connected at one end to the auxiliary line 10 and at the other end to one address line 2. Each of the discharge circuits 13 is connected at one end to the auxiliary line 10 and at the other end to one data line 3. The discharge circuits 12 an 13 are of the same structure. Therefore, only one of the discharge circuits 12 will be described with reference to FIG. 5. As seen from FIG. 5, the discharge circuit 12 comprises four discharging TFTs 21 to 24. The discharging TFTs 21 and 22 form a pair, which is connected between the auxiliary line 10 and the address line 2. The discharging TFTs 23 and 24 form a pair, which is connected between the auxiliary line 10 and the data line 2. The two TFT pairs are connected in series, constituting a discharge circuit 12.

The discharge TFTs 21 and 22 have two common source-drain electrodes, one of which is short-circuited to the gate of the TFT21 and the other of which is short-circuited to the gate of the TFT 22. Similarly, the discharge TFTs 23 and 24 have two common source-drain electrodes, one of which is short-circuited to the gate of the TFT23 and the other of which is short-circuited to the gate of the TFT 24.

The discharging TFTs 21 to 24 have the same channel length and the same channel width. As illustrated in FIG. 5, the TFT 21 has channel capacitances $21a$ and $21b$; the TFT 22 has channel capacitances $22a$ and $22b$; the TFT 23 has channel capacitances $23a$ and $23b$; and the TFT 24 has channel capacitances $24a$ and $24b$.

When a positive electrostatic potential is applied to the address line 2, raising the potential of the address line 2 above that of the auxiliary line 10, the TFTs 21 and 23 of the discharging circuit 12 are turned on. The electric charge is thereby discharged from the address line 2 to the auxiliary line 10 via the discharging TFTs 21 and 23. As a result, the switching TFTs 17 are protected from the static electricity.

An electrostatic voltage applied to the auxiliary line 10 and the address line 2 is distributed to the channel capacitance $21b$ of the TFT 21, the channel capacitance $22a$ of the TFT 22, the channel capacitor $23b$ of the TFT 23 and the channel capacitor $24a$ of the TFT 24. The voltage applied to the gate-insulating film of each of the discharging TFTs 21 to 24 is about half the electrostatic voltage which has been applied to the auxiliary line 10 and the address line 2. The gate-insulating films of the TFTs 21 to 24 will hardly be destroyed.

Hence, even if a high electrostatic potential is applied to the auxiliary line 10 or the address line 2, the gate-insulating films of the TFTs 21 to 24 would not be destroyed. The address line 2 and the auxiliary line 10 would not be short-circuited to each other. Nor would the switching TFTs be broken down. There is no possibility that the liquid-crystal display fails to be driven in normal way by the output signals of a driver IC.

As indicated above, only half the electrostatic voltage is applied to the gate-insulating film of each of the discharging TFTs 21 to 24. In view of this, the discharge circuit 12 is advantageous. Additionally, it is relatively easy to manufacture since its structure is essentially the same as that of the conventional discharge circuit shown in FIG. 2.

As can be understood from the above, in the liquid-crystal display according to the first embodiment, the switching TFTs 17 are protected from static electricity more reliably than in the conventional thin-film transistor liquid-crystal display. The liquid-crystal display can therefore be manufactured at a higher yield.

Some of the discharging TFTs constituting each of discharge circuits 12 and 13 may have pin holes in their gate-insulating films while being formed, due to dust particles or undesirable film-forming conditions. However, the probability that both TFT pairs of a discharge circuit have defective TFTs is low. Should one of the TFT pairs have defective TFTs, the other TFT pair whose constituent discharging TFTs are flawless can protect the switching TFTs 17 from static electricity.

Assume a very high electrostatic potential is applied to the auxiliary line 10 or the address line 2, breaking down the channel capacitance of the discharging TFT 21. In this case, the potential of the address line 2 is applied directly to the gate of the discharging TFT 23, whereby the TFT 23 is turned on. The charge accumulated in the address line 2 is therefore transferred to the auxiliary line 10.

In the case where the channel capacitance 23b of the discharging TFT 23 is broken down, the potential of the address line 2 is applied directly to the gate of the discharging TFT 21, whereby the TFT 21 is turned on. In this case, too, the charge accumulated in the address line 2 is therefore transferred to the auxiliary line 10, thus protecting the switching TFTs 17 from static electricity.

The total threshold voltage of the discharging TFTs constituting the discharge circuit 12 is relatively high since it is proportional to the number of the TFT pairs which are connected in series and each of which consists of two TFTs connected in parallel. Because of the high total threshold voltage of the discharging TFTs, the power the circuit 12 consumes but a little power to compensate the on-current which leaks from the discharging TFTs operating at normal voltage.

Figure 8:
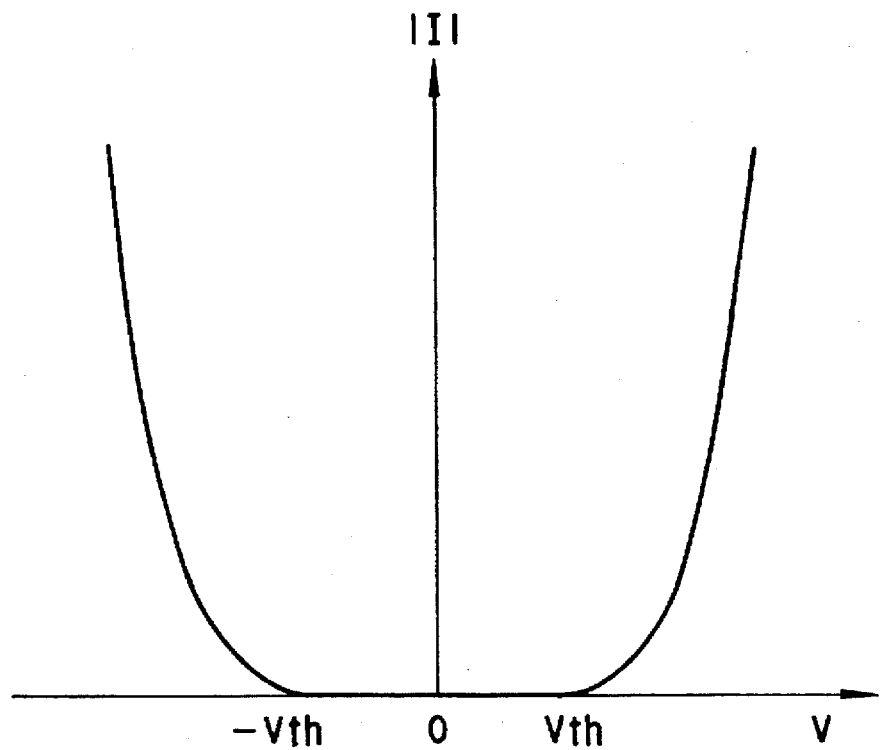
FIG. 8 is a graph representing the current-voltage characteristic of each of the discharge circuits incorporated in the first embodiment.

The discharge circuit 12 has the current-voltage characteristic illustrated in FIG. 8. As evident from FIG. 8, the current-voltage characteristic is nonlinear. In other words, when voltage V rises above the threshold voltage $V_{th}$ of each discharging TFT, the resistance of the discharging TFT decreases greatly, and a large current I flows through the discharging TFT. Thus, when a high voltage such as an electrostatic potential is applied to the discharging TFT, the resistance of the TFT decreases so greatly that static electricity is effectively dissipated to the auxiliary line 10. Since the current-voltage characteristic is symmetric with respect to 0V as seen from FIG. 8, the discharge circuit 12 can not only dissipate static electricity effectively but also drive the switching TFTs in a normal way.

The above-described advantages of the discharge circuit 12 are found also in each of the discharge circuits 13 which are connected at one end to the data lines 3, respectively, and at the other end to the auxiliary line 10.

As indicated above, each of the discharge circuits 12 and 13 comprises two TFT pairs which are connected in series and each of which consists of two discharging TFTs connected in parallel. Even if the address line 2, the data line 3 or the auxiliary line 10 comes to have a high potential, the discharging TFTs will be turned on, dissipating static electricity to the auxiliary line 10. Hence, the discharge circuits 12 and 13 prevent the switching TFTs 17 from being broken down. Equipped with the discharge circuits 12 and 13, the liquid-crystal display according to the first embodiment can be manufactured at a higher yield than the conventional liquid-crystal display which incorporates the discharge circuit shown in FIG. 2.

Second Embodiment 2

Another liquid-crystal display which is the second embodiment of the present invention will be described, with reference to FIG. 6. FIG. 6 is a circuit diagram of one of the identical discharge circuits provided on the TFT-array substrate of the second embodiment. The components similar or identical to those shown in FIG. 5 are designated at the same reference numerals and will not be described in detail.

As illustrated in FIG. 6, the discharge circuit is connected at one end to an address line 2 and at the other end to an auxiliary line 1. The circuit comprises three pairs of discharging TFTs, which are connected in series. The first TFT pair consists of two discharging TFTs 21 and 22 connected in parallel; the second TFT pair consists of two discharging TFTs 23 and 24 connected in parallel; and the third TFT pair consists of two discharging TFTs 25 and 26 connected in parallel.

The TFTs 21 and 22 have two common source-drain electrodes, which are connected to the gate of the TFT 21 and the gate of the TFT 22, respectively. Similarly, the TFTs 23 and 24 have two common source-drain electrodes, which are connected to the gate of the TFT 23 and the gate of the TFT 24, respectively, and the TFTs 25 and 26 have two common source-drain electrodes, which are connected to the gate of the TFT 25 and the gate of the TFT 26, respectively.

The discharging TFTs 21 to 26 have the same channel length and the same channel width. As shown in FIG. 5, the TFT 21 has channel capacitances 21a and 21b; the TFT 22 has channel capacitances 22a and 22b; the TFT 23 has channel capacitances 23a and 23b; the TFT 24 has channel capacitances 24a and 24b; the TFT 25 has channel capacitances 25a an 25b; and the TFT 26 has channel capacitances 26a and 26b.

When a positive electrostatic potential is applied to the address line 2, raising the potential of the address line 2 above that of the auxiliary line 10, the TFTs 21, 23 and 25 of the discharging circuit are turned on. The electric charge is thereby discharged from the address line 2 to the auxiliary line 10 via the discharging TFTs 21, 23 and 25. As a result, the switching TFTs 17 are protected from the static electricity.

When a negative electrostatic potential is applied to the address line 2, raising the potential of the address line 2 below that of the auxiliary line 10, the TFTs 22, 24 and 26 of the discharging circuit are turned on. The electric charge is thereby discharged from the address line 2 via the discharging TFTs 22, 24 and 26 to the auxiliary line 10. The switching TFTs 17 are thus protected from the static electricity.

The discharge circuits achieve the same advantages as their counterparts 12 and 13 used in the first embodiment. In addition, the voltage applied to the gate-insulating film of each of the discharging TFTs 21 to 26 is about a third of the electrostatic voltage which has been applied to the auxiliary line 10 and the address line 2. The gate-insulating films of the TFTs 21 to 26 will more hardly be destroyed than those of the discharging TFTs incorporated in the discharge circuit shown in FIG. 5.

Should the discharging TFTs forming one of the three TFT pairs be destroyed, the discharging TFTs forming the other two TFT pairs would remain operative. The two TFT pairs serve to dissipate to the auxiliary line 10 the static electricity, if any, generated thereafter during the manufacture of the liquid-crystal display, as in the first embodiment.

Should the discharging TFTs forming two of the three TFT pairs be simultaneously short-circuited to become defective, the discharge circuit would remain operative as a whole. Therefore, the liquid-crystal display according to the second embodiment can be manufactured at a higher yield than the liquid-crystal display according to the first embodiment.

Third Embodiment

Still another liquid-crystal display which is the third embodiment of this invention will be described, with reference to FIG. 7. FIG. 7 is a circuit diagram of one of the identical discharge circuits provided on the TFT-array substrate of the third embodiment. The components similar or identical to those shown in FIG. 5 are designated at the same reference numerals and will not be described in detail.

As shown in FIG. 7, this discharge circuit comprises two circuit units which are connected in parallel. The first circuit unit is constituted by two discharging TFT pairs which are connected in series. Similarly, the second circuit unit is constituted by two discharging TFT pairs which are connected in series. In the first circuit unit, the first TFT pair consists of two discharging TFTs 21 and 22 connected in parallel, and the second TFT pair consists of two discharging TFTs 23 and 24 connected in parallel. In the second circuit unit, the first TFT pair consists of two discharging TFTs 21 and 22 connected in parallel, and the second TFT pair consists of two discharging TFTs 23 and 24 connected in parallel. Namely, the discharge circuit is comprised of two discharge circuits which are identical to the discharge circuit 12 (FIG. 5) and which are connected in parallel.

Obviously, the discharge circuit shown in FIG. 7 has redundancy. It remains operative even if lines connecting some or all of the TFTs forming one circuit unit are cut during the manufacture of the liquid-crystal display. This is because the other circuit unit serves to dissipate static electricity to the auxiliary line 10. By contrast, the discharge circuit 12 (FIG. 5) cannot protect the TFT-array substrate 1 against static electricity if the lines connecting the TFTs 21 and 22 of the first pair to the TFTs 23 and 24 of the second pair are cut during manufacture of the liquid-crystal display. A passage for dissipating static electricity is no longer provided between the address line 2 and the auxiliary line 10.

Fourth Embodiment

Figure 9:
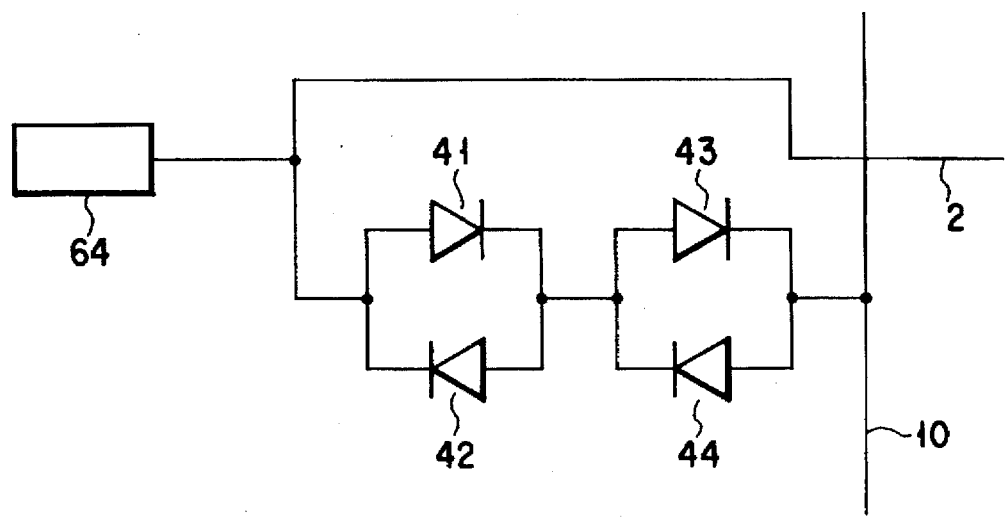
FIG. 9 is a circuit diagram illustrating the discharge circuit formed on the TFT-array substrate of a thin-film transistor liquid-crystal display according to a fourth embodiment of the invention.

A liquid-crystal display according to the fourth embodiment of the invention will be described, with reference to FIG. 9. FIG. 9 is a circuit diagram of one of the identical discharge circuits provided on the TFT-array substrate of the fourth embodiment. The components similar or identical to those shown in FIG. 5 are designated at the same reference numerals and will not be described in detail.

The discharge circuit shown in FIG. 9 differs from the discharge circuit shown in FIG. 5 in that discharging diodes are used in place of discharging TFTs 21 to 24. More precisely, the circuit comprises two diode pairs connected in series. The first pair consists of two diodes 41 and 42 connected in parallel in inverse polarity, and the second pair consists of two diodes 43 and 44 connected in parallel in inverse polarity.

The discharging diodes 41 to 44 are of n-i structure, which has an n-type semiconductor layer interposed between the intrinsic semiconductor layer and one source-drain electrode of one switching TFT. To be more specific, the diode consists of a metal layer, an insulating layer, an intrinsic semiconductor layer, an n-type semiconductor layer and a metal layer which are mounted one upon another in the order mentioned, or may consists of a metal layer, an intrinsic semiconductor layer, an n-type semiconductor layer and a metal layer which are mounted one upon another in the order mentioned. The discharging diode can be formed in the same process, together with the switching TFTs. The n-type semiconductor layer is a silicon layer containing an n-type impurity such as phosphorus (P). The concentration of the n-type impurity is about $1 \times 10^{20}$ to $1 \times 10^{23}$ m$^{-3}$.

When a voltage higher than the threshold voltage of the discharging diodes 41 to 44, the resistance of the diodes 41 to 44 decreases in nonlinear fashion. A large current therefore flows through the discharging diodes 41 to 44. Static electricity is thereby effectively dissipated via the diodes 41 to 44 to the auxiliary line 10.

Alternatively, the discharging diodes 41 to 44 may be of p-n structure comprising a p-type semiconductor layer and an n-type semiconductor layer. The p-type semiconductor layer contains, for example, boron (B) in a concentration of $1 \times 10^{20}$ to $1 \times 10^{23}$ m$^{31\ 3}$. More specifically, each diode may consist of a metal layer, an insulating layer, a p-type semiconductor layer, an n-type semiconductor layer and a metal layer which are mounted one upon another in the order mentioned, or may consist of a metal layer, a p-type semiconductor layer, an n-type semiconductor layer and a metal layer which are mounted one upon another in the order mentioned.

Furthermore, the discharge diodes 41 to 44 may be replaced by metal-insulator-metal (MIM) diodes. The MIM diodes are more simple in structure than diodes of the n-i structure or the p-n structure.

Whichever type of diodes it incorporates, the discharge circuit shown in FIG. 9, this is the case, operates exactly in the same way as the discharge circuit shown in FIG. 5. Hence, the liquid-crystal display according to the fourth embodiment achieves the same advantage as the first embodiment (FIGS. 3 and 4.) Even if the discharging diodes forming one of the two pairs are short-circuited, the discharge circuit would remain operative as a whole because the other diode pair serves to protect the switching TFTs 17 against static electricity.

In the case where the discharging diodes 41 to 44 are MIM diodes, the discharging circuit can protect switching elements other than TFTs, which constitute a matrix array.

Fifth Embodiment

A liquid-crystal display according to the fifth embodiment of the present invention will be described, with reference to FIGS. 9, 11 and 12. FIG. 10 is a schematic plan view of the display, FIG. 11 shows one of the identical discharge circuits incorporated in the display, and FIG. 12 shows another type of an alternative discharge circuit which may be used in the display. The components shown in FIG. 10, which are similar or identical to those shown in FIG. 5, are designated at the same reference numerals and will not be described in detail.

As can be understood from FIG. 10, the fifth embodiment differs from the first embodiment in two respects. First, an additional auxiliary line 20 is provided, forming a rectangular loop surrounding an auxiliary line 10 which is also a rectangular loop surrounding the display matrix. Second, two sets of discharge circuits, i.e., circuits 14 and 15, are provided in addition to discharge circuits 12 and 13, on the TFT-array substrate 1. As in the first embodiment, each discharge circuit 12 is connected at one end to the first auxiliary line 10 and at the other end to one address line 2, and each discharge circuit 13 is connected at one end to the first auxiliary line 10 and at the other end to one data line 3. On the other hand, each discharge circuit 14 is connected at one end to the second auxiliary line 20 and at the other end to one address line 2, and each discharge circuit 15 is connected at one end to the second auxiliary line 20 and at the other end to one data line 3.

The discharge circuits 12 and 13 are of the same structure, each comprising two TFT pairs connected in series. Each pair consists of charging TFTs $57_1$ and $57_2$ connected in parallel. The discharge circuits 14 an 15 are of the same structure, each comprising one TFT pair which consists of charging TFTs $57_3$ and $57_4$ connected in parallel.

Incorporating the discharge circuits 12, 13, 14 and 15 described above, the liquid-crystal display shown in FIG. 10 have not only the same advantages as the first embodiment shown in FIG. 3, but also the following advantages because of the discharge circuits 14 and 15 added.

Each of the circuits 14 and 15 consists of only two discharge TFTs which are TFTs $57_3$ and $57_4$ connected in parallel. It therefore has a lower resistance than the discharge circuits 12 and 13 which comprises two TFT pairs each. Each discharge circuit 14 cooperates with one discharge circuit 12, and each discharge circuit 15 cooperates with one discharge circuit 13, to dissipate static electric from the switching TFTs 17 more efficiently than in the first embodiment.

It is necessary to prevent electrostatic discharge from occurring between the TFT-array substrate and the counter substrate 11 during the process of combining the substrates 1 and 11 together. During this process, the counter substrate 11 remains at a higher electro-static potential than the TFT-array substrate 1. The static electricity at the counter substrate 11 must be quickly dissipated to the TFT-array substrate 1.

As shown in FIG. 10, the first auxiliary line 10 is short-circuited directly to terminals 4, and the second auxiliary line 20 is short-circuited to the terminals 4 by means of nonlinear elements 16. The terminals 4 are provided on the counter substrate 11, for supplying electric power to the transparent electrode (not shown) provided on the counter substrate 11.

When the array substrate 1 and the counter electrode 11 are bonded to each other during the manufacture of the liquid-crystal display (TFT-LCD), a high electrostatic potential is distributed from the counter electrode 11 to the auxiliary lines 10 and 20 through the terminals 4 provided on the counter substrate 11. If a high voltage is applied to the first auxiliary line 20 at this time, the discharge circuits 14 and 15 may be most likely broken down. To prevent the breakdown of the circuits 14 and 15, each nonlinear elements 16 is connected between one terminal 4 and the first auxiliary line 20. The element 16 is a resistive element which has its resistance abruptly decreased when it receives a high voltage, allowing a passage of a large current. The nonlinear elements 16 may be of the same structure as the discharge circuits 14 and 15. In the case where the elements 16 have the same structure as the circuits 14 and 15, it is desirable that their resistance be lower than that of the discharge circuits 14 and 15. For example, the TFTs of a circuit identical to the discharge circuits 14 and 15 may have a broader channel, whereby these TFTs constitute a nonlinear element 16 having a low resistance.

The nonlinear elements 16 can limit the current which will flow through the first auxiliary line 20. In addition, the elements 16 can lower the voltage to be applied to the discharge circuits 14 and 15 which are connected to the first auxiliary line 20.

In the liquid-crystal display according to the fifth embodiment, the nonlinear elements 16 serve to prevent the discharging TFTs from destroyed by static electricity and effectively dissipate static electricity. More specifically, when a low electrostatic potential is applied to the terminals 4 are provided on the counter substrate 11, the discharge circuits 14 and 15 connected in series to the second auxiliary line 20 can fully dissipate the static electricity. During the dissipation of static electricity, the nonlinear elements 16 maintain high resistance, and a current scarcely flows through the first auxiliary line 20. When a high electrostatic potential is applied to the terminals 4, the nonlinear elements 16 come to have low resistance, whereby an electrostatic current flows to both auxiliary lines 10 and 20, thus dissipating the static electricity.

As described above, with the liquid-crystal display (TFT-LCD) which is the fifth embodiment and which incorporates the auxiliary lines 10 and 20, the nonlinear elements 16 and the like, it is possible to effectively dissipate various types of static electricity generated during the manufacture of the display.

As can be understood from FIG. 11, the discharge circuits 12 and 13 are identical in structure to their counterparts incorporated in the first embodiment. The circuits 12 and 13 may be replaced by their counterparts used in the second, third or fourth embodiment. Moreover, the discharge circuits 14 and 15 may be replaced by circuits consisting of two diodes each, which are connected in parallel in inverse polarity. Still further, the discharge circuits 14 and 15 may be provided outside the TFT-array substrate 1 so as to be ultimately removed from the TFT-array substrate 1.

The present invention is not limited to the above-described embodiments which are thin-film transistor liquid-crystal displays. Rather, the invention can be applied to semiconductor memories, each having a TFT-memory array.

In the embodiments described above, TFTs are provided on the matrix-array substrate and used as switching elements. Instead, switching elements of any other type, such as MIM diodes, may be provided on the matrix-array substrate.

Furthermore, discharge circuits may be connected only between the auxiliary line and the data line or only between the auxiliary line and the address lines, not between the auxiliary line and the data line and between the auxiliary line and the address lines as in any embodiment described above.

As has been described, the present invention can provide a semiconductor device comprising a matrix array of switching elements (e.g., TFTs), which has discharge means capable of more reliably protecting the switching elements from static electricity that the conventional discharge circuits and which can therefore be manufactured at a sufficiently high yield.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. The semiconductor device comprising:
    a matrix array having a plurality of address lines, a plurality of data lines and switching elements provided at intersections of said address lines and said data lines;
    a first auxiliary line surrounding said matrix array; and
    a first static electricity discharging means connected between said first auxiliary line and said address and/or data lines, said first static electricity discharging means comprising a first transistor discharge circuit and a second transistor discharge circuit connected in parallel to the first transistor discharge circuit, each of said transistor discharge circuits having a plurality of thin-film transistors (TFTs) connected in series.

2. The device according to claim 1, wherein said plurality of thin-film transistors comprise a plurality of discharging TFT pairs which are connected in series, the discharging TFTs of each pair having two common source-drain electrodes, one of which is short-circuited to the gate of one of the TFTs forming the pair and the other of which is short-circuited to the gate of the other of the TFTs forming the pair.

3. The device according to claim 1, wherein the switching elements of said matrix array have a TFT transistor each.

4. The device according to claim 1, wherein the switching elements of said matrix array have an MIM transistor each.

5. The device according to claim 1, further comprising a second auxiliary line provided outside said matrix array and surrounding said first auxiliary line, and a second static electricity discharging means connected between said second auxiliary line and said address and/or data lines and having a plurality of switching elements connected in series.

6. The device according to claim 5, wherein said second static electricity discharging means comprises a third discharge circuit having a plurality of switching elements connected in series and a fourth discharge circuit having a plurality of switching elements connected in series.

7. The device according to claim 5, wherein said second static electricity discharging means comprises a transistor discharge circuit having a plurality of thin-film transistors connected in series.

8. The device according to claim 5, wherein said second static electricity discharging means comprises a diode discharge circuit having a plurality of diodes connected in series.

9. The device according to claim 5, further comprising counter-substrate terminals provided on said matrix array and short-circuited to said first auxiliary line, and nonlinear elements connected between the counter-substrate terminals and said second auxiliary line.

10. The semiconductor device comprising:
   a matrix array having a plurality of address lines, a plurality of data lines and switching elements provided at intersections of said address lines and said data lines;
   a first auxiliary line surrounding said matrix array; and
   a first static electricity discharging means connected between said first auxiliary line and said address and/or data lines, said first static electricity discharging means comprising a first discharge circuit having a plurality of switching elements connected in series and a second discharge circuit having a plurality of diode pairs connected in series, each diode pair consisting of two diodes connected in parallel in inverse polarity.

11. The device according to claim 10, wherein the switching elements of said matrix array have a TFT transistor each.

12. The device according to claim 10, wherein the switching elements of said matrix array have an MIM transistor each.

13. The device according to claim 10, further comprising a second auxiliary line provided outside said matrix array and surrounding said first auxiliary line, and a second static electricity discharging means connected between said second auxiliary line and said address and/or data lines and having a plurality of switching elements connected in series.

14. The device according to claim 13, wherein said second static electricity discharging means comprises a third discharge circuit having a plurality of switching elements connected in series and a fourth discharge circuit having a plurality of switching elements connected in series.

15. The device according to claim 13, wherein said second static electricity discharging means comprises a transistor discharge circuit having a plurality of thin-film transistors connected in series.

16. The device according to claim 13, wherein said second static electricity discharging means comprises a diode discharge circuit having a plurality of diodes connected in series.

17. The device according to claim 13, further comprising counter-substrate terminals provided on said matrix array and short-circuited to said first auxiliary line, and nonlinear elements connected between the counter-substrate terminals and said second auxiliary line.

18. The semiconductor device comprising:
   a matrix array having a plurality of address lines, a plurality of data lines and switching elements provided at intersections of said address lines and said data lines;
   a first auxiliary line surrounding said matrix array;
   a first static electricity discharging means connected between said first auxiliary line and said address and/or data lines, said first static electricity discharging means comprising a first discharge circuit having a plurality of switching elements connected in series and a second discharge circuit having a plurality of switching elements connected in series;
   a second auxiliary line provided outside said matrix array and surrounding said first auxiliary line; and
   a second static electricity discharging means connected between said second auxiliary line and said address and/or data lines and having a plurality of switching elements connected in series, said second static electricity discharging means comprising a third discharge circuit having a plurality of switching elements connected in series and a fourth discharge circuit having a plurality of switching elements connected in series.

19. The device according to claim 18, wherein said first static electricity discharging means comprises a transistor discharge circuit having a plurality of thin-film transistors connected in series.

20. The device according to claim 19, wherein said transistor discharge circuit comprises a plurality of thin-film transistor pairs which are connected in series, the discharging TFTs of each pair having two common source-drain electrodes, one of which is short-circuited to the gate of one of the TFTs forming the pair and the other of which is short-circuited to the gate of the other of the TFTs forming the pair.

21. The device according to claim 18, wherein said first static electricity discharging means comprises a first transistor discharge circuit and a second transistor discharge circuit connected in parallel to the first transistor discharge circuit, each of said transistor discharge circuits having a plurality of thin-film transistors connected in series.

22. The device according to claim 18, wherein said first static electricity discharging means comprises a diode discharge circuit having a plurality of diodes connected in series.

23. The device according to claim 22 wherein said diode discharge circuit comprises a plurality of diode pairs connected in series, each diode pair consisting of two diodes connected in parallel in inverse polarity.

24. The device according to claim 18, wherein the switching elements of said matrix array have a TFT transistor each.

25. The device according to claim 18, wherein the switching elements of said matrix array have an MIM transistor each.

26. The semiconductor device comprising: a matrix array having a plurality of address lines, a plurality of data lines and switching elements provided at intersections of said address lines and said data lines;
   a first auxiliary line surrounding said matrix array;
   a first static electricity discharging means connected between said first auxiliary line and said address and/or data lines, said first static electricity discharging means comprising a first discharge circuit having a plurality of switching elements connected in series and a second discharge circuit having a plurality of switching elements connected in series;

a second auxiliary line provided outside said matrix array and surrounding said first auxiliary line; and a second static electricity discharging means connected between said second auxiliary line and said address and/or data lines and having a plurality of switching elements connected in series, said second static electricity discharging means comprising a transistor discharge circuit having a plurality of thin-film transistors connected in series.

27. The device according to claim 26, wherein said first static electricity discharging means comprises a transistor discharge circuit having a plurality of thin-film transistors connected in series.

28. The device according to claim 27, wherein said first transistor discharge circuit comprises a plurality of thin-film transistor pairs which are connected in series, the discharging TFTs of each pair having two common source-drain electrodes, one of which is short-circuited to the gate of one of the TFTs forming the pair and the other of which is short-circuited to the gate of the other of the TFTs forming the pair.

29. The device according to claim 26, wherein said first static electricity discharging means comprises a first transistor discharge circuit and a second transistor discharge circuit connected in parallel to the first transistor discharge circuit, each of said transistor discharge circuits having a plurality of thin-film transistors connected in series.

30. The device according to claim 26, wherein said first static electricity discharging means comprises a diode discharge circuit having a plurality of diodes connected in series.

31. The device according to claim 30, wherein said diode discharge circuit comprises a plurality of diode pairs connected in series, each diode pair consisting of two diodes connected in parallel in inverse polarity.

32. The device according to claim 26, wherein the switching elements of said matrix array have a TFT transistor each.

33. The device according to claim 26, wherein the switching elements of said matrix array have an MIM transistor each.

34. The semiconductor device comprising:

a matrix array having a plurality of address lines, a plurality of data lines and switching elements provided at intersections of said address lines and said data lines;

a first auxiliary line surrounding said matrix array;

a first static electricity discharging means connected between said first auxiliary line and said address and/or data lines, said first static electricity discharging means comprising a first discharge circuit having a plurality of switching elements connected in series and a second discharge circuit having a plurality of switching elements connected in series;

a second auxiliary line provided outside said matrix array and surrounding said first auxiliary line; and a second static electricity discharging means connected between said second auxiliary line and said address and/or data lines and having a plurality of switching elements connected in series, said second static electricity discharging means comprising a diode discharge circuit having a plurality of diodes connected in series.

35. The device according to claim 34, wherein said first static electricity discharging means comprises a transistor discharge circuit having a plurality of thin-film transistors connected in series.

36. The device according to claim 35, wherein said transistor discharge circuit comprises a plurality of thin-film transistor pairs which are connected in series, the discharging TFTs of each pair having two common source-drain electrodes, one of which is short-circuited to the gate of one of the TFTs forming the pair and the other of which is short-circuited to the gate of the other of the TFTs forming the pair.

37. The device according to claim 34, wherein said first static electricity discharging means comprises a first transistor discharge circuit and a second transistor discharge circuit connected in parallel to the first transistor discharge circuit, each of said transistor discharge circuits having a plurality of thin-fill transistors connected in series.

38. The device according to claim 34, wherein said first static electricity discharging means comprises a diode discharge circuit having a plurality of diodes connected in series.

39. The device according to claim 38, wherein said diode discharge circuit comprises a plurality of diode pairs connected in series, each diode pair consisting of two diodes connected in parallel in inverse polarity.

40. The device according to claim 34, wherein the switching elements of said matrix array have a TFT transistor each.

41. The device according to claim 34, wherein the switching elements of said matrix array have an MIM transistor each.

42. The semiconductor device comprising:

a matrix array having a plurality of address lines, a plurality of data lines and switching elements provided at intersections of said address lines and said data lines;

a first auxiliary line surrounding said matrix array;

a first static electricity discharging means connected between said first auxiliary line and said address and/or data lines, said first static electricity discharging means comprising a first discharge circuit having a plurality of switching elements connected in series and a second discharge circuit having a plurality of switching elements connected in series;

a second auxiliary line provided outside said matrix array and surrounding said first auxiliary line;

a second static electricity discharging means connected between said second auxiliary line and said address and/or data lines and having a plurality of switching elements connected in series; and counter-substrate terminals provided on said matrix array and short-circuited to said first auxiliary line, and nonlinear elements connected between the counter-substrate terminals and said second auxiliary line.

43. The device according to claim 42, wherein said first static electricity discharging means comprises a transistor discharge circuit having a plurality of thin-film transistors connected in series.

44. The device according to claim 43, wherein said transistor discharge circuit comprises a plurality of thin-film transistor pairs which are connected in series, the discharging TFTs of each pair having two common source-drain electrodes, one of which is short-circuited to the gate of one of the TFTs forming the pair and the other of which is short-circuited to the gate of the other of the TFTs forming the pair.

45. The device according to claim 42, wherein said first static electricity discharging means comprises a first transistor discharge circuit and a second transistor discharge circuit connected in parallel to the first transistor discharge circuit, each of said transistor discharge circuits having a plurality of thin-film transistors connected in series.

46. The device according to claim 42, wherein said first static electricity discharging means comprises a diode discharge circuit having a plurality of diodes connected in series.

47. The device according to claim 46, wherein said diode discharge circuit comprises a plurality of diode pairs connected in series, each diode pair consisting of two diodes connected in parallel in inverse polarity.

48. The device according to claim 42, wherein the switching elements of said matrix array have a TFT transistor each.

49. The device according to claim 42, wherein the switching elements of said matrix array have an MIM transistor each.

50. The semiconductor device comprising:
- a matrix array having a plurality of address lines, a plurality of data lines and switching elements provided at intersections of said address lines and said data lines;
- a first auxiliary line surrounding said matrix array;
- a first static electricity discharging means connected between said first auxiliary line and said address and/or data lines, said first static electricity discharging means comprising a first discharge circuit having a plurality of switching elements connected in series and a second discharge circuit having a plurality of switching elements connected in series;
- a second auxiliary line provided outside said matrix array and surrounding said first auxiliary line; and
- a second static electricity discharging means connected between said second auxiliary line and said address and/or data lines and having a plurality of switching elements connected in series.

* * * * *